United States Patent [19]

Morimoto

[11] Patent Number: 5,149,428

[45] Date of Patent: Sep. 22, 1992

[54] WATER FILTER WITH EXTENDED OPERATIONAL PERIOD

[75] Inventor: Yukichi Morimoto, Anjoh, Japan

[73] Assignee: Atlas Corporation, Tokyo, Japan

[21] Appl. No.: 643,236

[22] Filed: Jan. 18, 1991

[30] Foreign Application Priority Data

Jan. 19, 1990 [JP] Japan ................................. 2-8485

[51] Int. Cl.⁵ ............................................. B01D 24/02
[52] U.S. Cl. .................................. 210/283; 210/288; 210/349; 210/350; 210/354
[58] Field of Search ............... 210/283, 288, 349, 350, 210/354, 455

[56] References Cited

U.S. PATENT DOCUMENTS

| | | | |
|---|---|---|---|
| 2,076,935 | 4/1937 | Burckhalter | 210/288 |
| 2,638,581 | 5/1953 | Marvel | 210/349 |
| 2,668,622 | 2/1954 | Irvine et al. | 210/288 |
| 3,167,399 | 1/1965 | Hansen, Jr. | 210/288 |
| 3,512,645 | 5/1970 | Rosaen | 210/349 |

*Primary Examiner*—Robert A. Dawson
*Assistant Examiner*—Wanda L. Millard
*Attorney, Agent, or Firm*—Armstrong, Nikaido, Marmelstein, Kubovcik & Murray

[57] ABSTRACT

A water filter with improved filtration efficiency and extended operational period. The filter includes a cassette member filled with filtration and activation agents, where a water path connecting a water inlet pipe and an open upper end of the cassette member is formed between an outer housing member and the cassette member, while an open lower end is directly connected with the water inlet pipe; a center pipe located inside the cassette member for connecting an inside of the cassette member with a water outlet pipe; and a damper member placed inside the cassette member which is vertically slidable along the center pipe, which divides the inside of the cassette member into an upper filtration chamber connected with the upper end and a lower filtration chamber connected with the lower end, where the water flows through the upper filtration chamber from the upper end and the lower filtration chamber from the lower end alternatively.

4 Claims, 2 Drawing Sheets

WATER FILTER WITH EXTENDED OPERATIONAL PERIOD

BACKGROUND OF THE INVENTION

1. Field of the Invention

The present invention relates to a water filter for purifying tap water to obtain clean water.

2. Description of the Background Art

Conventionally, filtration of water and an activation of water have been achieved by separate equipment designed for each purpose.

A filter to be utilized in the filtration of the water is most commonly either a so called gravitational type in which the original water is poured from an upper portion of the filter and made to run down through filtration agents filling the interior of the filter, such that external elements contained in the original water such as sludges are filtered out by the filtration agents and the clean water can be obtained at a lower portion of the filter, or a so-called called centrifugal type in which the water and external elements contained in the original water are separated by means of a centrifugal force generated by a high speed rotation of an inner cylinder containing the original water with respect to an outer cylinder in a double cylinder configuration.

However, such a conventional water filter requires a large number of valves, and control of these large number of valves can be quite tedious.

Also, as a conventional water filter is operated, the filtration becomes more difficult as a result of clogging due to the filtration agents and the sludges remaining inside the filter, so that a conventional water filter becomes inoperative in a rather short period of time. This has necessitated frequent maintenance operations for keeping the filter in a working condition, which are also quite tedious.

SUMMARY OF THE INVENTION

It is therefore an object of the present invention to provide a water filter capable of performing both of the filtration and the activation of the water, capable of separating the external elements from the water more effectively so that a highly purified clean water can be obtained, and also capable of extending an operational period of the filter by reducing the clogging due to the filtration elements and external elements.

This object is achieved in the present invention by providing a water filter, comprising: a housing member connected to a water inlet pipe; a cassette member filled with filtration and activation agents, which is located inside the housing member, and which has open upper and lower ends, where a water path connecting the water inlet pipe and the upper end is formed between the housing member and the cassette member, while the lower end is directly connected with the water inlet pipe; a center pipe located inside the cassette member for connecting an inside of the cassette member with a water outlet pipe; and a damper member placed inside the cassette member which is vertically slidable along the center pipe, which divides the inside of the cassette member into an upper filtration chamber connected with the upper end and a lower filtration chamber connected with the lower end, where the water flows through the upper filtration chamber from the upper end and the lower filtration chamber from the lower end alternatively.

Other features and advantages of the present invention will become apparent from the following description taken in conjunction with the accompanying drawings.

DETAILED DESCRIPTION OF THE PREFERRED EMBODIMENTS

Figure 1:
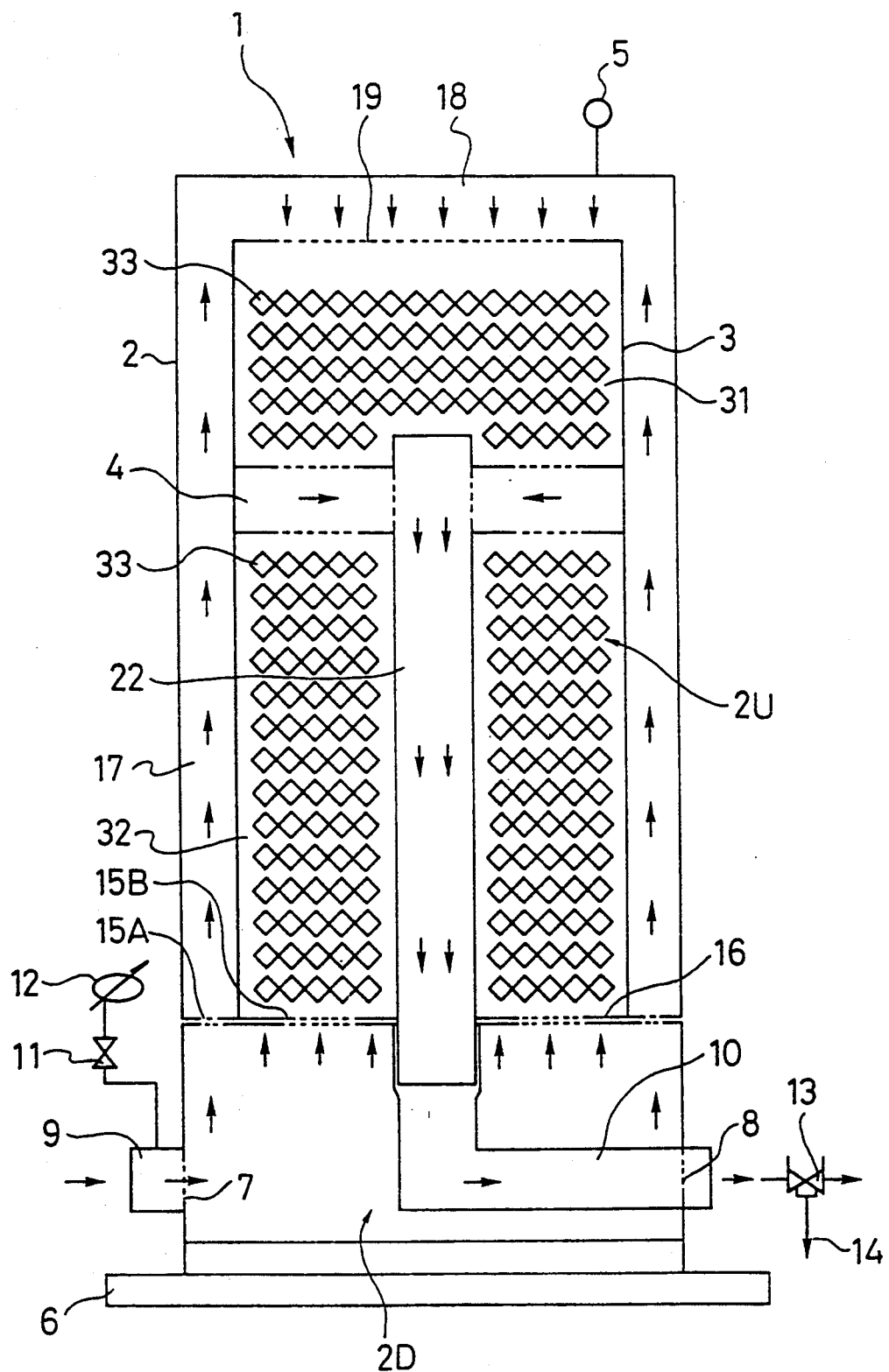
FIG. 1 is a schematic cross sectional view of one embodiment of a water filter according to the present invention.
Figure 2:
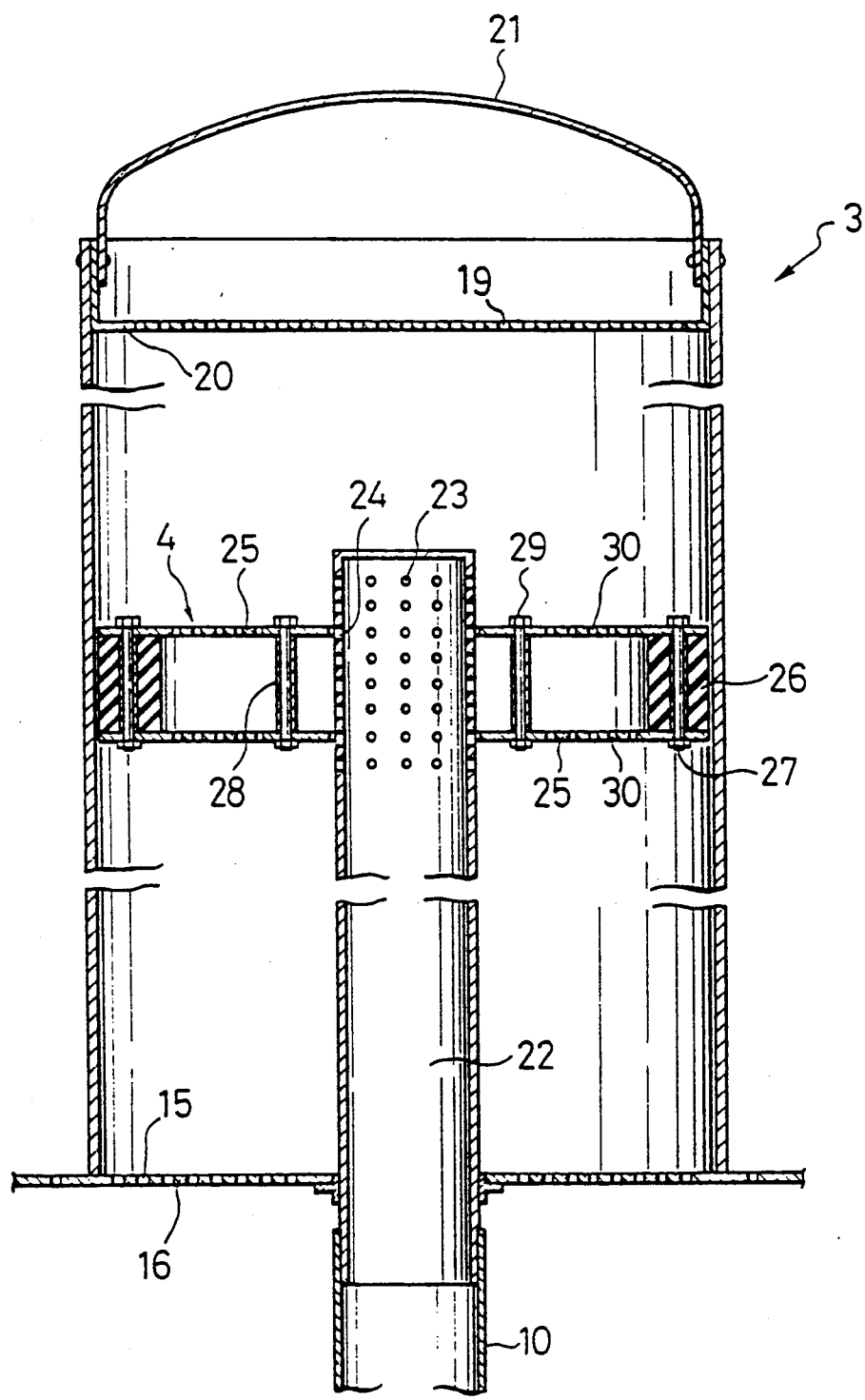
FIG. 2 is an enlarged cross-sectional view of a main part of the water filter of FIG. 1.

Referring now to FIG. 1 and FIG. 2, there is shown one embodiment of a water filter according to the present invention.

This water filter 1 generally comprises a housing (outer cylinder) 2, a cassette (inner cylinder) 3 installed inside the housing 2, and a damper 4 located inside the cassette 3.

The housing 2 has a cylindrical shape with an upper end closed and a lower end open. On the closed upper end of this housing 2, there is provided an automatic air release valve 5. The open lower end of this housing 2 is fixed on a base frame 6.

On a side surface near the open lower end of the housing 2, there is provided a water inlet port 7 connected to a water inlet pipe 9, and a water outlet port 8 connected to a water outlet pipe 10.

The water inlet pipe 9 is equipped with a pressure gauge 12 connected to the water inlet pipe 9 through a control valve 11, while the water outlet port 8 is equipped with a switching valve 13 such that the water coming out from the water outlet port 8 can be led to a branching pipe 14 by controlling this switching valve 13.

The cassette 3 has a cylindrical shape with both upper and lower ends open, and is installed inside the housing 2 coaxially. The size of the cassette 3 is smaller than that of the housing 2 by such an extent that, when the cassette 3 is installed inside the housing 2, an annular side path 17 and an upper condensation chamber 18 are formed between the housing 2 and the cassette 3.

A bottom of the cassette 3 inside the housing 2 is fixed to a bottom plate 16 having a multiplicity of tiny holes 15A located beneath the annular side path 17 formed between the housing 2 and a multiplicity of tiny holes the cassette 3, and 15B located beneath the cassette 3. This bottom plate 16 effectively divides the inside of the housing 2 into an upper chamber 2U and the lower chamber 2D, where the ratio of a volume of the upper chamber 2U with respect to that of the lower chamber 2D is set to be approximately 3:1.

On an upper end of the cassette 3, there is provided a detachable lid 20 having a multiplicity of tiny holes 19 of the same size as those of the bottom plate 16. This detachable lid 20 is equipped with a handle 21 for facilitating an easy manual operation to detach the lid 20, as shown in FIG. 2, which can be pulled out into an operative standing position shown in FIG. 2 from a pulled down position at which it is housed inside the lid 20.

Inside of the cassette 3, there is provided a center pipe 22 which is fixed to the bottom plate 16 and which extends up to about two third of a length of the cassette 3. A top end of this center pipe 22 is closed, while an open bottom end of this center pipe 22 passes through the center of the bottom plate 16 and connected to the water outlet pipe 10 at the lower chamber 2D. On a side surface near the top end of this center pipe 22, a multiplicity of tiny holes 23 of the same size as those of the bottom plate 16 are provided.

The damper 4 placed inside the cassette has a central opening 24 receiving the center pipe 22, so that the damper 4 is capable of sliding up and down vertically along the center pipe 22. The damper 4 is normally positioned at about one half to one third of the length of the cassette 3 away from the top end of the cassette 3.

As shown in detail in FIG. 2, the damper 4 comprises a pair of round plates 25 fixed in a predetermined separation by a set of bolt joints 27 provided near the circumference of the round plates 25, and by separation pieces 28 provided near the center of the round plates 28 which are fixed to the round plate by another set of bolt joints 29 and which also reinforces the strength of the damper 4. Also, along the circumference of the round plates 25, there is provided a hard rubber ring 26 placed between the round plates 25. The round plates 25 also have a multiplicity of tiny holes 30 of the same size as those of the bottom plate 16.

An upper filtration chamber 31 formed between the lid 20 of the cassette 3 and the upper one of the round plates 25 of the damper 4, and a lower filtration chamber 32 formed between the lower one of the round plates 25 of the damper 4 and the bottom plate 16 are filled with filtration and activation agents 33 made of numerous identical particles of calcite and numerous identical particles of calcite ceramic.

The water filter 1 having such a configuration operates as follows.

The pumped original water transferred through the water inlet pipe 9 is sent into the lower chamber 2D through the water inlet port 7. This water then flows through the effectively frictionless annular side path 17 up to the upper condensation chamber 18, and pours into the cassette 3 through the holes 19 on the lid 20. Here, a fraction of the water also flows into the cassette 3 from the holes 15B on the bottom plate 16, but due to the larger resistance of this route with respect to the water, only a minor fraction of the water takes this route.

The majority of the water flowing into the cassette 3 from the upper condensation chamber 18 side then runs down through the filtration and activation agents 33 filling the interior of the upper filtration chamber 31, in a process in which the external elements contained in the water are removed by the filtration and activation agents 33, while the minerals dissolve from the calcite elements of the filtration and activation agents 33 to activate the filtered water.

The clean and active water thus obtained flows into the damper 4 through the holes 30 on the upper one of the round plates 25, and then flows into the center pipe 22 through the holes 23 on the central pipe 22, and finally flows out through the water outlet pipe 10, water outlet port 8 and switching valve 13.

Now, as this filtration process goes on, a layer of the external elements piled up on the filtration and activation agents 33 in the upper filtration chamber 31 gets thicker, which in turn increases a loss of the pressure of the water flowing into the cassette 3 through the upper condensation chamber 18.

When the loss of the pressure of the water exceeds the pressure of the water in the lower chamber 2D, the majority of the water stops flowing through the annular side path 17, and instead starts to flow into the lower filtration chamber 32 from the holes 15B on the bottom plate 16.

As a result, a dynamic pressure due to the water flowing into the cassette 3 from the bottom plate 16 side becomes stronger and the damper 4 is pushed upwards. This upward motion of the damper 4 compresses the layer of the external elements against the particles of the filtration and activation agents 33 in the upper filtration chamber 31.

Meanwhile, the water flowing through the holes 15B runs up through the filtration and activation agents 33 filling the interior of the lower filtration chamber 32, in a process in which the external elements contained in the water are removed by the filtration and activation agents 33, while the minerals dissolve from the calcite elements of the filtration and activation agents 33 to activate the filtered water.

The clean and active water thus obtained flows into the damper 4 through the holes 30 on the lower one of the round plates 25, and then flows into the center pipe 22 through the holes 23 on the central pipe 22, and finally flows out through the water outlet pipe 10, water outlet port 8 and switching valve 13.

Next, as this filtration process further goes on, a layer of the external elements piled up on the filtration and activation agents 33 in the lower filtration chamber 32 gets thicker, which in turn increases a loss of the pressure of the water flowing into the cassette 3 through the bottom plate 16. As a result, a dynamic pressure due to the water flowing into the cassette 3 from the bottom plate 16 side becomes weaker again, and the water stops flowing through the holes 15B on the bottom plate 16, which destroys the equilibrium of the pressure inside the cassette 3 so that the damper 4 slides down.

This downward motion of the damper 4 compresses the layer of the external elements against the particles of the filtration and activation agents 33 in the lower filtration chamber 32. At the same time, this downward motion of the damper 4 also causes a production of cracks on the compressed external elements in the upper filtration chamber 31 due to shocks provided by the water flowing through the damper 4. Due to these cracks, the loss of the pressure of the water in the upper filtration chamber 31 is decreased, and the initial state in which the water flows through the annular side path 17 and the upper condensation chamber 18 to the cassette 3 is restored.

Next, the water flowing through the holes 19 runs down through the filtration and activation agents 33 filling inside the upper filtration chamber 31 again, in a process of which the external elements contained in the water are removed by the filtration and activation agents 33, while the minerals dissolve from the calcite elements of the filtration and activation agents 33 to activate the filtered water as before. The clean and active water thus obtained flows into the damper 4 through the holes 30 on the lower one of the round plates 25, and then flows into the center pipe 22 through the holes 23 on the central pipe 22, and finally flows out through the water outlet pipe 10, water outlet port 8 and switching valve 13 as before.

Now, as this filtration process goes on, a layer of the external elements piled up on the filtration and activation agents 33 in the upper filtration chamber 31 gets thicker, which in turn increases a loss of the pressure of the water flowing into the cassette 3 through the upper condensation chamber 18.

When the loss of the pressure of the water exceeds the pressure of the water in the lower chamber 2D, the majority of the water stops flowing through the annular side path 17, and instead starts to flow into the lower filtration chamber 32 from the holes 15B on the bottom plate 16.

As a result, a dynamical pressure due to the water flowing into the cassette 3 from the bottom plate 16 side becomes stronger again and the damper 4 is pushed upwards again. This upward motion of the damper 4 compresses the layer of the external elements against the particles of the filtration and activation agents 33 in the upper filtration chamber 31 as before. At the same time, this upward motion of the damper 4 also causes a production of cracks on the compressed external elements in the lower filtration chamber 32 due to shocks provided by the water flowing through the damper 4, and the loss of the pressure of the water in the lower filtration chamber 32 is decreased so that the water starts to flow into the cassette 3 from the bottom plate 16 side again, and the process described above will be repeated thereafter.

After the water filtration operation as described above is performed for a prescribed period of time, the switching valve 13 is switched to the branching pipe 14, and the water pressure is tripled, so that the filtration and activation agents 33 are washed and the external elements are drained through the branching pipe 14.

Thus, according to this embodiment of the present invention, it becomes possible to provide a water filter capable of performing both of the filtration and the activation of the water, capable of separating the external elements from the water more effectively as the external elements are compressed to acquire smaller volumes and then cracked, and capable of extending an operational period of the filter by reducing the clogging due to the filtration elements and external elements.

Because of these advantages, the present invention is particularly useful in locations where the usual back washing process for washing the filter is difficult.

It is to be noted that, many modifications and variations of the above embodiment may be made without departing from the novel and advantageous features of the present invention. Accordingly, all such modifications and variations are intended to be included within the scope of the appended claims.

What is claimed is:

1. A water filter, comprising:
    a housing member connected to a water inlet pipe;
    a cassette member filled with filtration and activation agents, which is located inside the housing member, and which has open upper and lower ends, where a water path connecting the water inlet pipe and the upper end is formed between the housing member and the cassette member, while the lower end is directly connected with the water inlet pipe;
    a center pipe located inside the cassette member for connecting an inside of the cassette member with a water outlet pipe; and
    a damper member placed inside the cassette member in contact with the filtration and activation agents, which vertically slides along the center pipe during a filtration operation by the cassette member while keeping contact with the filtration and activation agents, and which divides the inside of the cassette member into an upper filtration chamber connected with the upper end and a lower filtration chamber connected with the lower end, where the water flows through the upper filtration chamber from the upper end and the lower filtration chamber from the lower end alteratively.

2. The filter of claim 1, wherein the damper member moves upwards when the water stops flowing from the upper end, and moves downwards when the water stops flowing from the lower end.

3. The filter of claim 2, wherein the upwards motion of the damper member compresses external elements removed from the water by the filtration and activation agents in the upper filtration chamber, wherein the downwards motion of the damper member compresses external elements removed from the water by the filtration and activation agents in the lower filtration chamber.

4. The filter of claim 3, wherein the upwards motion of the damper produces cracks on the external elements compressed by a previous downwards motion of the damper member, and wherein the downwards motion of the damper produces cracks on the external elements compressed by a previous upwards motion of the damper member.

* * * * *